United States Patent
Minami et al.

(10) Patent No.: US 6,542,151 B1
(45) Date of Patent: Apr. 1, 2003

(54) METHOD AND APPARATUS FOR DISPLAYING POLYGON IMAGES, AND RECORDING MEDIUM

(75) Inventors: Tatsuma Minami, Tokyo (JP); Takanori Murayama, Tokyo (JP)

(73) Assignees: Konami Corporation, Tokyo (JP); KCE Tokyo Inc., Tokyo (JP)

( * ) Notice: Subject to any disclaimer, the term of this patent is extended or adjusted under 35 U.S.C. 154(b) by 265 days.

(21) Appl. No.: 09/663,317

(22) Filed: Sep. 15, 2000

(30) Foreign Application Priority Data

Sep. 30, 1999 (JP) .......................................... 11-280871

(51) Int. Cl.$^7$ ............................................. G06T 15/00
(52) U.S. Cl. ...................................................... 345/419
(58) Field of Search .............................. 345/419, 420, 345/422, 426, 619, 620, 629

(56) References Cited

U.S. PATENT DOCUMENTS

| 5,748,198 A | 5/1998 | Takeda et al. ............... 345/441 |
| 5,767,857 A | 6/1998 | Neely ......................... 345/427 |

FOREIGN PATENT DOCUMENTS

EP    1 033 682    9/2000

OTHER PUBLICATIONS

An article entitled "Real–Time Nonphotorealistic Rendering", By Markosian et al., published Aug. 3, 1997, pp. 415–420.

An article entitled, "Second Edition in C Computer Graphics Principles and Practice", By Foley et al., published Jul., 1997.

An article entitled "Interactive Technical Illustration", By Gooch et al., published by Department of Computer Science., 1998.

An article entitled "Image Precision Silhouette Edges", By Raskar et al., published by University of North Carolina at Chapel Hill. Apr. 1999.

Patent Abstracts of Japan Publication No. 2001–101441 entitled Method and Device for Rendering, Game System and Computer . . . , By Imai et al., published Apr. 13, 2001.

Patent Abstracts of Japan Publication No. 2000–251094 entitled Device and Method for Processing Image, By Iwade et al., published Sep. 14, 2000.

Patent Abstracts of Japan Publication No. 07–141525 entitled Method and Device for Three–Dimensional Image Generation, By Kazutaka Nishio, published Jun. 2, 1995.

*Primary Examiner*—Phu K. Nguyen
(74) *Attorney, Agent, or Firm*—Bachman & LaPointe, P.C.

(57) ABSTRACT

A similar polygon, which is larger than a basic polygon and has a similar shape to the basic polygon, is disposed to face the obverse surface of the basic polygon. A different texture from that of the basic polygon is pasted on the similar polygon. Then, a polygon image including the basic polygon and the similar polygon is displayed. When the polygon image is viewed from a certain viewpoint, the similar polygon is seen behind the basic polygon in a ring-like form, which serves as an edge of the basic polygon. As a result, a three-dimensional image using polygons can be provided with an edge.

23 Claims, 11 Drawing Sheets

METHOD AND APPARATUS FOR DISPLAYING POLYGON IMAGES, AND RECORDING MEDIUM

BACKGROUND OF THE INVENTION

1. Field of the Invention

The present invention generally relates to three-dimensional image display techniques and, more particularly, to a technique for displaying three-dimensional images by using polygons.

2. Description of the Related Art

One of the known techniques for displaying three-dimensional images is to use polygons. Generally, in the image displaying technique using polygons, the surface of a three-dimensional object having a complicated configuration is divided into polygons, and a pattern or a design, which is referred to as a "texture", is pasted on each polygon.

In this polygon-based image display technique, moving pictures can appear very realistic while requiring only a small amount of data compared to graphic images, such as photographs. Additionally, this polygon-based technique makes it possible to display three-dimensional images. Accordingly, with these advantages, the polygon-based techniques are widely used in game machines in which images must be quickly moved in response to player's instructions. In view of this background, research is being conducted on the polygon-based image display techniques so as to reduce a load on game machines and also to display realistic images while providing three-dimensional effects.

Along with the use of polygons, attention is sometimes focussed on the advantage of displaying realistic images while requiring only a small amount of data. For example, if moving pictures created by using a large number of cell images are replaced by moving pictures using polygons, not only the load on the machines, but also human resources required for creating cell images, can be reduced.

However, polygon-based moving pictures appear very realistic because of its development purposes, and images consisting of edges and solid portions, which are generally unique to the moving pictures created by cell images, cannot be expressed very well by this polygon-based display technique. Accordingly, by using the polygon-based image display technique, moving pictures similar to those created by cell images cannot be obtained.

SUMMARY OF THE INVENTION

Accordingly, in view of this background, it is an object of the present invention to increase the range of applicability of a polygon-based image display technique by making it possible to add edges to polygon-based three-dimensional images.

In order to achieve the above object, according to one aspect of the present invention, there is provided a polygon-image display method for use in an apparatus for displaying a polygon image on a predetermined display unit, the polygon image being generated by combining basic polygons for rendering a three-dimensional object. The polygon-image display method includes the step of rendering a similar polygon, the reverse surface of which faces the obverse surface of the basic polygon. The similar polygon is larger than the basic polygon and has a similar shape to the basic polygon, and forms a pair with the basic polygon.

The above-described polygon-image display method utilizes the feature unique to the polygon-based image display technique. That is, for preventing image flickering, it is determined that polygons with their reverse surfaces facing a certain viewpoint are not seen. According to the above method, since an image of the similar polygon is displayed together with an image of the basic polygon, the entire three-dimensional object represented by a combination of the basic polygons is covered with the similar polygon, the reverse surface of which faces the obverse surface of the basic polygon. With this arrangement, the similar polygon which is pasted on the basic polygon and is located behind the basic polygon can be displayed as the edge of the three-dimensional object. In other words, the portion of the similar polygon outside the basic polygon can be used as the edge of the basic polygon.

As is seen from the foregoing description, since the similar polygon must be located outside the basic polygon, it is determined to be larger than the basic polygon. Additionally, the similar polygon used as an edge of the basic polygon has substantially the same thickness, and thus, the similar polygon has a similar shape to the basic polygon. Because of this figure, the similar polygon can be easily generated from the basic polygon data.

To promote edge enhancement of the similar polygon, a different texture from that of the basic polygon is pasted on the similar polygon.

In this case, the similar polygon may be created by being calculated based on the basic polygon data when a polygon image is displayed, or similar polygon data may be prepared to form a pair with the basic polygon data. In the second case, the similar polygon data may be stored in a storage unit, and may be displayed based on the similar polygon data. Also in the second case, calculations are not required for indicating the similar polygon, and thus, this technique can be extensively used not only for displaying predetermined images, but also for game fields in which images must be quickly displayed in response to player's instructions.

According to the foregoing polygon-image display method, the center of gravity of the similar polygon may coincide with that of the corresponding basic polygon. With this arrangement, the widths of the portion of the similar polygon outside the basic polygon can be consistent, and can thus be suitably used as an edge of the basic polygon.

In the aforementioned method, the order of rendering the basic polygon and the similar polygon is not particularly restricted. Either of the polygons may be rendered first, or both the polygons may be rendered simultaneously. If the similar polygon is rendered first followed by rendering of the basic polygon, the basic polygon image is provided with a perimeter edge. That is, if a plurality of similar polygons or basic polygons overlap, the polygon closest to the viewpoint is preferentially displayed. Accordingly, by rendering the similar polygon first and then by pasting the basic polygon on the similar polygon, the portion of the similar polygon outside the adjacent basic polygons is located behind the basic polygons and is thus unseen on the polygon image. As a result, only the perimeter edge of a three-dimensional object represented by a set of basic polygons is displayed as viewed from the current viewpoint, thereby providing edge effects.

The above-described method may further include the steps of: detecting normal vectors of other basic polygon which are adjacent to each of the vertices of the basic polygon corresponding to the similar polygon; determining a unit vector having a direction identical to the direction of a sum vector of the normal vectors; setting the forward end of the unit vector to an edge point for each of the vertices of the basic polygon as an original point; and shifting the vertices of the similar polygon to the edge points.

With this arrangement, the vertices of the similar polygon which determine the width of the portion outside the basic polygon can be located away from the vertices of the basic polygons by the corresponding unit vectors. It is thus possible to maintain a constant width of the edge to be drawn by the outside portion of the similar polygon, thereby facilitating edge enhancement from an aesthetic point of view.

The above-described steps may be prepared when the data for rendering the similar polygon is created. In this case, by displaying only the similar polygon and the basic polygon, a sharp edge can be displayed without the need for performing specific calculations.

In the aforementioned method, the unit vector may be multiplied by a predetermined coefficient so as to determine a displacement vector, and the forward end of the displacement vector may be set to be the edge point for each of the vertices of the basic polygon as an original point, thereby shifting the vertices corresponding to the similar polygon to the edge points. With this arrangement, it is possible to draw each edge with a predetermined width by the portion of the similar polygon outside the basic polygon. This makes it possible to vary the thickness of the edges, thereby adding variation to the edges. The above-described coefficient may be the same for all the unit vectors or may be differentiated among the individual unit vectors. In the second case, a predetermined coefficient may be pre-assigned to each of the vertices of each basic polygon.

The foregoing polygon-image display method may be implemented in the following type of apparatus.

According to another aspect of the present invention, there is provided a polygon-image display apparatus including a storage unit for storing basic polygon data concerning a basic polygon for rendering a three-dimensional object and similar polygon data concerning a similar polygon which is larger than the basic polygon and has a similar shape to the basic polygon in such a manner that the basic polygon data and the similar polygon data correspond to each other. A control unit generates the basic polygon and the corresponding similar polygon, the reverse surface of which faces the obverse surface of the basic polygon, based on the basic polygon data and the similar polygon data, respectively, read from the storage unit, and also displays an image of the basic polygon and an image of the similar polygon which is disposed on the obverse surface of the basic polygon.

The foregoing polygon-image display method may be implemented by reading a corresponding program code recorded on a recording medium into a predetermined computer, for example, a computer specifically used as a game machine, or a personal computer.

According to still another aspect of the present invention, there is provided a computer-readable recording medium for storing a program code which causes a computer to execute processing. The processing includes the steps of: reading from a storage unit basic polygon data concerning a basic polygon for rendering a three-dimensional object and similar polygon data concerning a similar polygon which is larger than the basic polygon and has a similar shape to the basic polygon, and the reverse surface of which faces the obverse surface of the basic polygon; generating the basic polygon and the corresponding similar polygon based on the read basic polygon data and the read similar polygon data, respectively; and displaying a polygon image including an image of the basic polygon and an image of the similar polygon which is disposed on the obverse surface of the basic polygon.

The program code described in this specification encompasses the concept of not only the program itself, but also data required for executing a game on a game machine and control parameters.

According to a further aspect of the present invention, there is provided a polygon-image display method for use in an apparatus for displaying a polygon image on a predetermined display unit, the polygon image being generated by combining basic polygons for rendering a three-dimensional object. The polygon-image display method includes the steps of: extracting, from edges of each of the basic polygon, an edge including an edge which is not adjacent to any other basic polygons and an edge which is also part of another adjacent basic polygon which is unseen from a current viewpoint; and drawing a segment along the extracted edge.

In this method, by extracting the above-described edge and drawing a segment along the edge, an edge can be added to the basic polygon.

The indication "basic polygon is unseen" means that basic polygon is located behind a front basic polygon or that the surface of the basic polygon which is not to be displayed faces a viewpoint. In the second case, for preventing image flickering, polygons with their reverse surfaces on are not generally displayed in displaying a polygon-based three-dimensional image. Thus, this characteristic of polygon is taken advantage of for forming an edge.

According to the above-described method, it is not necessary that the basic polygon is rendered first on a screen followed by the rendering of a segment. Regardless of which of the basic polygon and the segment is drawn first, it is sufficient if the segment is finally displayed along the outside of the edge of the basic polygon.

In drawing the segment, a different texture from that of the basic polygon may be disposed on the inside of each edge of the basic polygon by a predetermined width, or may be disposed on the outside of each edge of the basic polygon by a predetermined width. Alternatively, a different texture may be located both on the inside and the outside of each edge of the basic polygon.

In the aforementioned method, it is necessary not only to extract the edges which are not adjacent to other basic polygons, but also to extract the edges which are also part of another adjacent unseen polygon. The extraction of the second type of edges may be performed by any technique. For example, a normal vector of each of the basic polygon may be determined, and the inner product of the normal vector and a viewpoint vector in a viewing direction of the current viewpoint may be determined. Then, the edge which is adjacent to the unseen adjacent basic polygon may be extracted according to the sign of the inner product. Alternatively, order information concerning a predetermined order may be pre-assigned to one of each of the vertices and each of the edges of each of the basic polygons, and may be detected for each of the polygons so as to extract the edge which is adjacent to the unseen basic polygon according to the arrangement of the order information as viewed from the current viewpoint. In the second technique, it is determined whether the order of the information is arranged clockwise or counterclockwise as viewed from the current viewpoint.

In the above-described polygon-image display method, the segment may be drawn along the outside of the edge, and when the segment and the basic polygon overlap, the basic polygon may be preferentially displayed. With this arrangement, the segment which is at both edges adjacent to the basic polygons can be behind the basic polygons, so that it is not displayed on a polygon image. Accordingly, a three-dimensional object represented by a set of basic polygons is displayed only with the perimeter edge as viewed from the current viewpoint. That is, in this method, proper edging processing can be performed when displaying three-dimensional images.

In this method, it is necessary to draw a segment along the outside of the edge. Any kind of drawing technique may be employed, and one of which is as follows. In the aforementioned polygon-image display method, the step of drawing the segment may include the steps of: detecting normal vectors of each of the basic polygons which is adjacent to end points of the edge; determining a unit vector having a direction identical to the direction of a sum vector of the normal vectors; setting the forward end of the unit vector to an edge point for each of the end points of the edge as an original point and connecting the edge points to form another edge; and disposing an image having a different texture from the texture of the basic polygon between the edge of the basic polygon and the edge formed by connecting the edge points. According to this technique, the width of the segment is determined by the position of the edge points. Since the edge points are away from the vertices of the basic polygon by the unit vectors, the constant width of the segment can be maintained, thereby further promoting edge enhancement.

In the above-described technique, the step of drawing the segment may include the steps of: determining a displacement vector by multiplying the unit vector with a predetermined coefficient; setting the forward end of the displacement vector to an edge point for one of the end points of the edge as an original point; and disposing an image having a different texture from the texture of the basic polygon including the edge between the edge and another edge formed by connecting the original points.

With this arrangement, the segment having a predetermined width may be drawn, which makes it possible to vary the thickness of the segment, thereby adding variation to the resulting images. The above-described coefficient may be the same for all the unit vectors or may be differentiated among the unit vectors. In the second case, a predetermined coefficient may be pre-assigned to each of the vertices of each basic polygon.

The above-described polygon-image display method may be implemented in the following type of apparatus.

According to a yet further aspect of the present invention, there is provided a polygon-image display apparatus including a storage unit for storing basic polygon data concerning basic polygons for rendering a three-dimensional object. A control unit generates the basic polygons based on the basic polygon data read from the storage unit, and extracts, from edges of each of the basic polygons, an edge including an edge which is not adjacent to any other basic polygons and an edge which is also part of another adjacent basic polygon which is unseen from a current viewpoint. The control unit also generates a segment to be drawn along the edge, and displays a polygon image including an image of the basic polygon and an image of the segment on a predetermined display unit.

The foregoing polygon-image display method may be implemented by reading a corresponding program code recorded on a recording medium into a predetermined computer, such as a computer specifically used as a game machine or a personal computer.

According to a further aspect of the present invention, there is provided a computer-readable recording medium for storing a program code which causes a computer to execute processing. The processing includes the steps of: reading basic polygon data concerning a basic polygon for rendering a three-dimensional object; generating the three-dimensional object by a combination of the basic polygons based on the read data and generating an image of a similar polygon corresponding to each of the basic polygons; extracting, from edges of each of the basic polygons, an edge including an edge which is not adjacent to any other basic polygons and an edge which is also part of another adjacent basic polygon which is unseen from a current viewpoint; generating a segment to be drawn along the edge; and displaying an image of the basic polygon and an image of the segment on a predetermined display unit.

DESCRIPTION OF THE PREFERRED EMBODIMENTS

The present invention is described more fully through illustration of preferred embodiments.

First Embodiment

A description is given below of a method for displaying polygon images provided with edges by using similar polygons (similar polygon figures) according to a first embodiment of the present invention.

Figure 1:
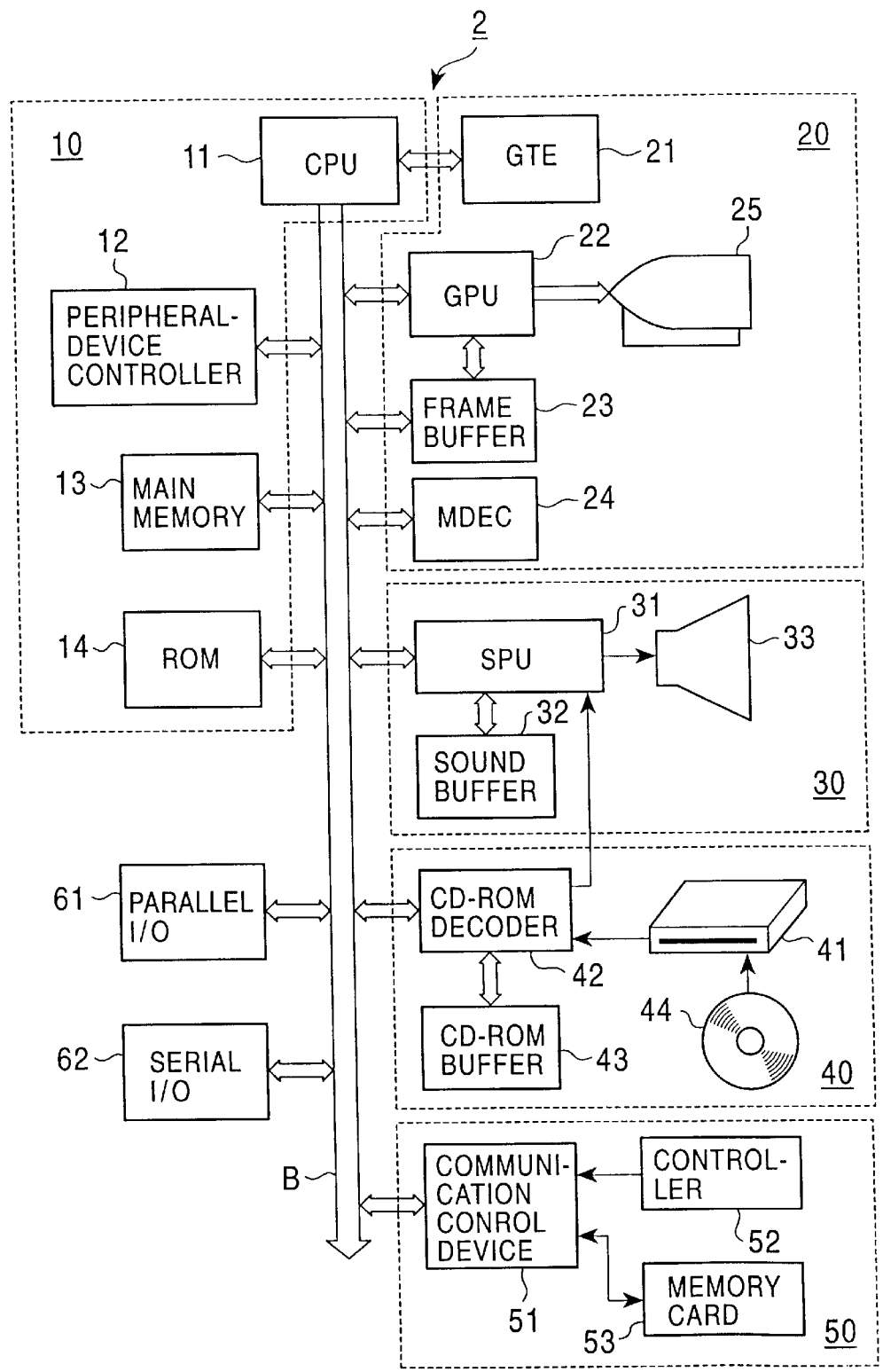
FIG. 1 is a block diagram illustrating the hardware configuration of a game machine incorporating the present invention.

The polygon-image display method of this embodiment is employed in the following type of polygon image display apparatus, which is formed as a video game machine 2 (see FIG. 1). As the video game machine 2, the game machine disclosed in Japanese Unexamined Patent Application Publication No. 8-212377 may be used. The game machine 2 is formed of, as shown in FIG. 1, a main control unit 10, an image processing unit 20, a sound processing unit 30, a disk control unit 40, a communication control unit 50, and a main bus B for connecting the above-described functional blocks 10 through 50 to enable bi-directional communications among them.

The main control unit 10 includes a central processing unit (CPU) 11, a peripheral-device controller 12 for performing interrupt control and direct memory access (DMA) transfer control, a main memory 13 for temporarily storing a game program and game-related data, and a read only memory (ROM) 14 for storing an operating system (OS) for managing the image processing unit 20, the sound processing unit 30, and so on. The CPU 11, which is a reduced instruction set computer (RISC) CPU, controls the basic operation of the entire machine 2 by executing the OS stored in the ROM 14 and also implements a plurality of functional blocks, which will be discussed below, by executing the game program within the main memory 13.

The image processing unit 20 is formed of a geometry transfer engine (GTE) 21 for performing, for example, fast coordinate transforms, on the data stored in the main memory 13, a graphics processing unit (GPU) 22 for rendering three-dimensional computer graphic (CG) images consisting of a combination of polygons and sprites (which are also considered to be polygons, such as triangles, quadrilaterals, etc., and hereinafter sprites will be encompassed in the concept of polygons) according to a rendering command from the CPU 11, a frame buffer 23 for temporarily storing three-dimensional CG images rendered by the GPU 22, and an image decoder (MDEC) 24 for decoding compressed image data if necessary. A display unit 25 reads the three-dimensional CG images from the frame buffer 23 and displays them.

By continuously rendering the three-dimensional CG images by the GPU 22 and storing the rendered CG images in the frame buffer 23, CG images including moving pictures can be displayed on the display unit 25.

The sound processing unit 30 includes a sound playback processor (SPU) 31 for generating sound effects, regular sound, music, etc. based on background environment sound data, a sound buffer 32 for temporarily storing sound data, such as sound effects, and sound source data, and a speaker 33 for outputting sound generated by the SPU 31.

The SPU 31 has the functions of playing back adaptive-differential-pulse-code-modulated (ADPCM) sound data recorded on the sound buffer 32 (ADPCM decoding function), playing back, for example, sound effects, by playing back the sound data recorded in the sound buffer 32, modulating the sound data recorded in the sound buffer 32 and playing it back (modulation function), and so on. Provided with these functions, the sound processing unit 30 can be used as a sampling sound source for generating sound effects, etc., based on the sound data recorded in the sound buffer 32.

The disk control unit 40 is provided with a disk drive 41 for reading a game program and game-related data (data which has been read will be hereinafter referred to as "read data") stored in a CD-ROM 44, a CD-ROM decoder 42 for decoding error correcting code (ECC) added to the read data, and a buffer 43 for temporarily storing the read data from the disk drive 41 before the data is stored in the main memory 13. The CD-ROM decoder 42 also forms part of the sound processing unit 30. An audio output of the decoder 42 is temporarily input into the SPU 31 and is mixed with an SPU output so as to be transformed into a final audio output via a reverb unit.

The communication control unit 50 is formed of a communication control device 51 for controlling communications with the CPU 11 via the main bus B, a controller 52 for receiving instructions by a player, and a memory card 53 for recording the game settings.

The controller 52, which is an interface component for receiving instructions by a player, includes various keys, such as a start key for starting the game, a reset key for resetting the game, selection keys for vertically and horizontally moving characters and for positioning a cursor to various menus and items, and instruction keys for instructing detailed operations of the character and selection menus. The controller 52 transmits the status of these keys to the communication control device 51 by synchronous communications.

The communication control device 51 sends the status of the keys of the controller 52 to the CPU 11, thereby transmitting the player's instructions to the CPU 11. The CPU 11 then displays images and progresses the game based on the game program in response to the player's instructions.

If it is necessary to record the current game settings according to the scenario, or the game result when the game is over or is still in progress, the CPU 11 transmits the corresponding data to the communication control device 51. Upon receiving the data from the CPU 11, the communication control device 51 records it in the memory card 53. Since the memory card 53 is separated from the main bus B, it is detachable from and attachable to the game machine 2 when powered on. With this arrangement, the settings and the result of the game can be recorded on a plurality of memory cards 53.

The game machine 2 itself has a parallel input/output (I/O) port 61 and a serial input/output (I/O) port 62, both of which are connected to the main bus B. The game machine 2 can be connected to peripheral devices via the parallel I/O port 61, and can communicate with other video game machines via the serial I/O port 62.

When the game machine 2 is powered on or reset while the CD-ROM 44, which serves as a recording medium of the present invention, is loaded in the disk drive 41, the CPU 11 executes the OS stored in the ROM 14. Then, the CPU 11 initializes the entire game machine 2, such as checking the operation, and also controls the disk control unit 40 so as to load the game program recorded on the CD-ROM 44 into the main memory 13 and runs it. By running the game program, the CPU 11 forms the functional blocks shown in FIG. 2 so as to implement the video game machine 2.

The amount of basic polygon data to be stored in basic-polygon-data storage units 240 and 440 (see FIG. 7) and the amount of similar polygon data to be stored in a similar-polygon-data storage unit 250, both of which will be discussed below, are considerably large. Thus, they may be directly read from the CD-ROM 44 rather than being loaded into the main memory 13.

Figure 2:
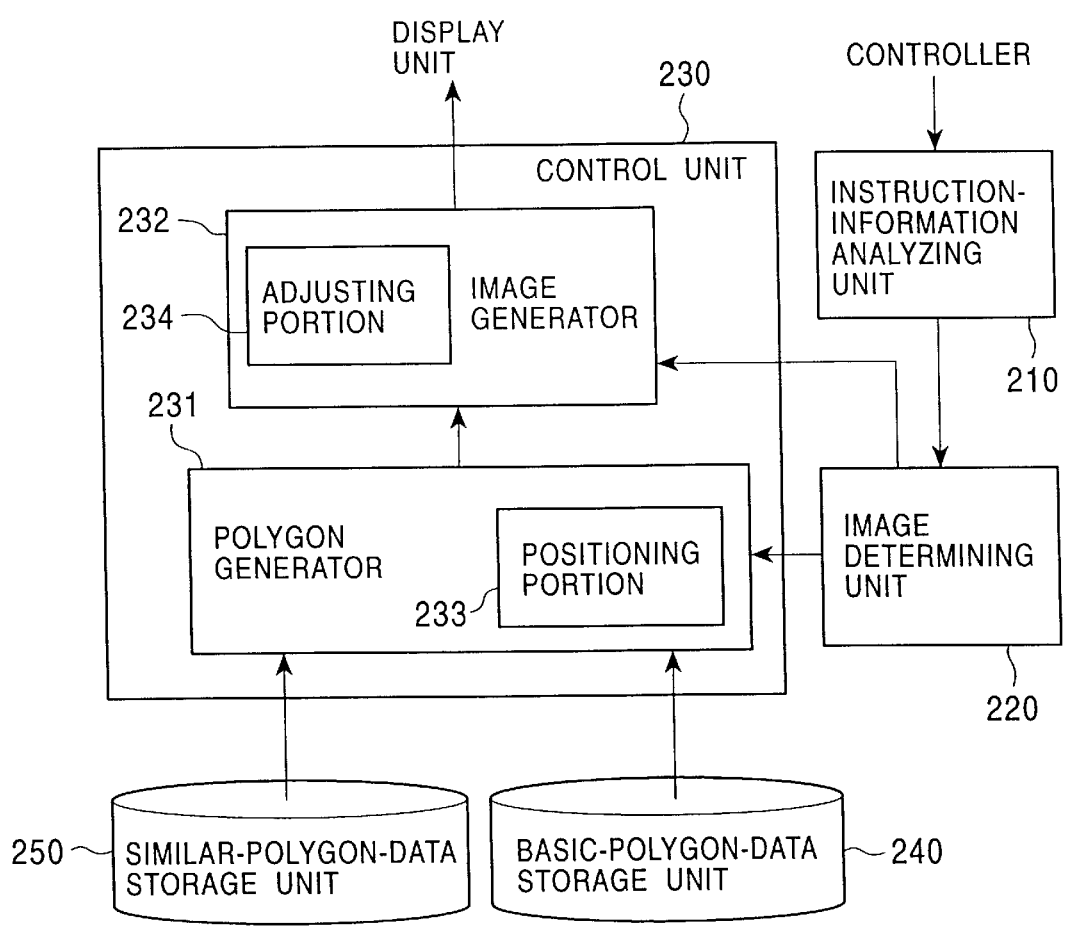
FIG. 2 is a functional block diagram illustrating one example of the configuration of a game machine according to a first embodiment of the present invention.

The video game machine 2 includes, as shown in FIG. 2, an instruction-information analyzing unit 210, an image determining unit 220, a control unit 230, and the basic-polygon-data storage unit 240 and the similar-polygon-data storage unit 250, both of which serve as recording units.

The instruction-information analyzing unit 210 is connected to the controller 52 and thus determines the content of the instruction input by the player through this controller 52. The image determining unit 220 is connected to the instruction-information analyzing unit 210 and thus determines the image to be displayed on the display unit 25 based on the content of the instruction sent from the instruction-information analyzing unit 210 and predetermined game scenarios and game rules.

The control unit 230 includes a polygon generator 231 and an image generator 232.

The basic-polygon-data storage unit 240 stores data concerning basic polygons for rendering images of, for example, humans or landscapes, to be displayed on the display unit 25 by a combination of the images. This basic polygon data indicates the size and shape of each polygon, the positional relationship between one polygon and another polygon, texture concerning the color and design of each polygon, and so on. The similar-polygon-data storage unit 250 contains similar polygon data concerning similar polygons, each forming a pair with the corresponding basic polygon. The similar polygon data contains data similar to that of the basic polygon data. Each similar polygon, having a similar shape to the corresponding basic polygon, is larger than the basic polygon, and the texture to be pasted on the similar polygon is different from that pasted to the basic polygon. The similar polygon is disposed to face the obverse surface of the basic polygon. In other words, a three-dimensional object formed by the similar polygons covers that formed by the basic polygons in such a manner that it faces the obverse surface of the object formed by the basic polygons. The positional relationship between the similar polygons and the basic polygons is described in detail below.

The polygon generator 231 reads the basic polygon data and the similar polygon data based on the data concerning the image determined by the image determining unit 220, and generates basic polygons and similar polygons based on the read data. The polygon generator 231 includes a positioning portion 233 for detecting the center of gravity of a basic polygon and that of a similar polygon so as to position the two centers of gravity.

The image generator 232 combines the basic polygons and the similar polygons generated by the polygon generator 231 so as to generate a polygon image to be displayed on the display unit 25. The image generator 232 includes an adjusting portion 234 for performing fine adjustment of the basic polygons and the similar polygons composed by the image generator 231 so as to enhance the edges of the image from an aesthetic point of view.

The operation of the game machine 2 is discussed below while referring to a polygon-image display method according to this embodiment.

Figure 3:
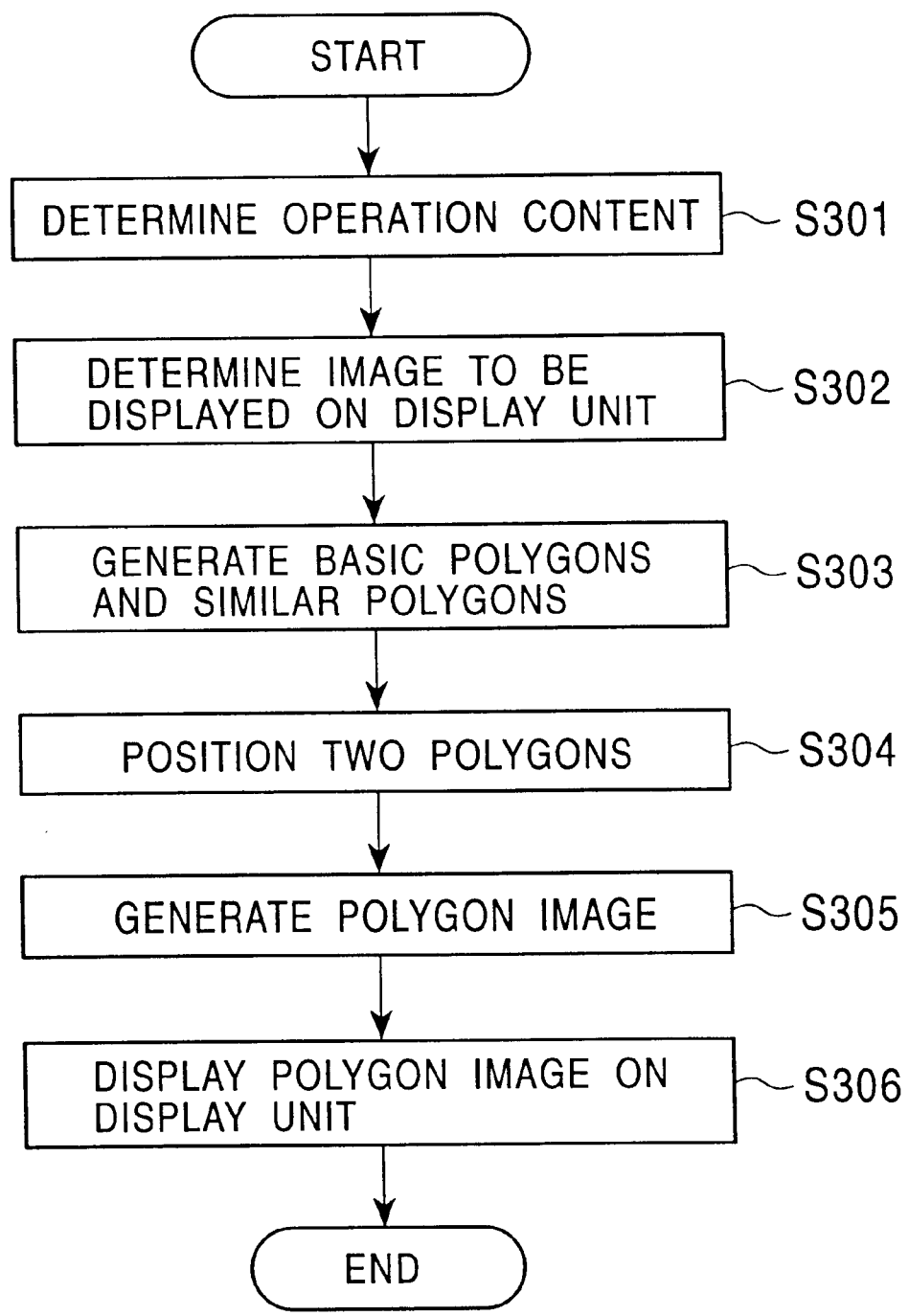
FIG. 3 is a flow chart illustrating a polygon-image display method according to the first embodiment of the present invention.

The game machine 2 executes a predetermined game according to predetermined scenarios and rules. The game machine 2 forms polygon images when displaying images on the display unit 25 after running the game or when displaying a demonstration image. Details of the image display operation by the game machine 2 are as follows, as shown in FIG. 3.

In displaying a polygon image, in step S301, the instruction-Information analyzing unit 210 first determines whether there is any instruction input by the player, and if any, further determines the content of the operation instruction input from the controller 52. Data concerning the content of the operation determined by the instruction-information analyzing unit 210 is sent to the image determining unit 220. Then, in step S302, the image determining unit 220 determines the image to be displayed on the display unit 25 based on the above-described data and the game scenario. The image determining unit 220 then sends data concerning the basic polygon required for creating the image to the polygon generator 231 and also sends other data required for creating the image to the image generator 232.

In step S303, the polygon generator 231 reads the basic polygon data and the similar polygon data from the basic-polygon-data storage unit 240 and the similar-polygon-data storage unit 250, respectively, and generates the basic polygons and the similar polygons based on the data.

In step S304, the positioning portion 233 detects the center of the gravity of each basic polygon and that of each similar polygon, and adjusts one center of gravity to the other center of gravity for a pair of a basic polygon and a similar polygon, thereby positioning the basic polygon and the similar polygon.

Figure 4:
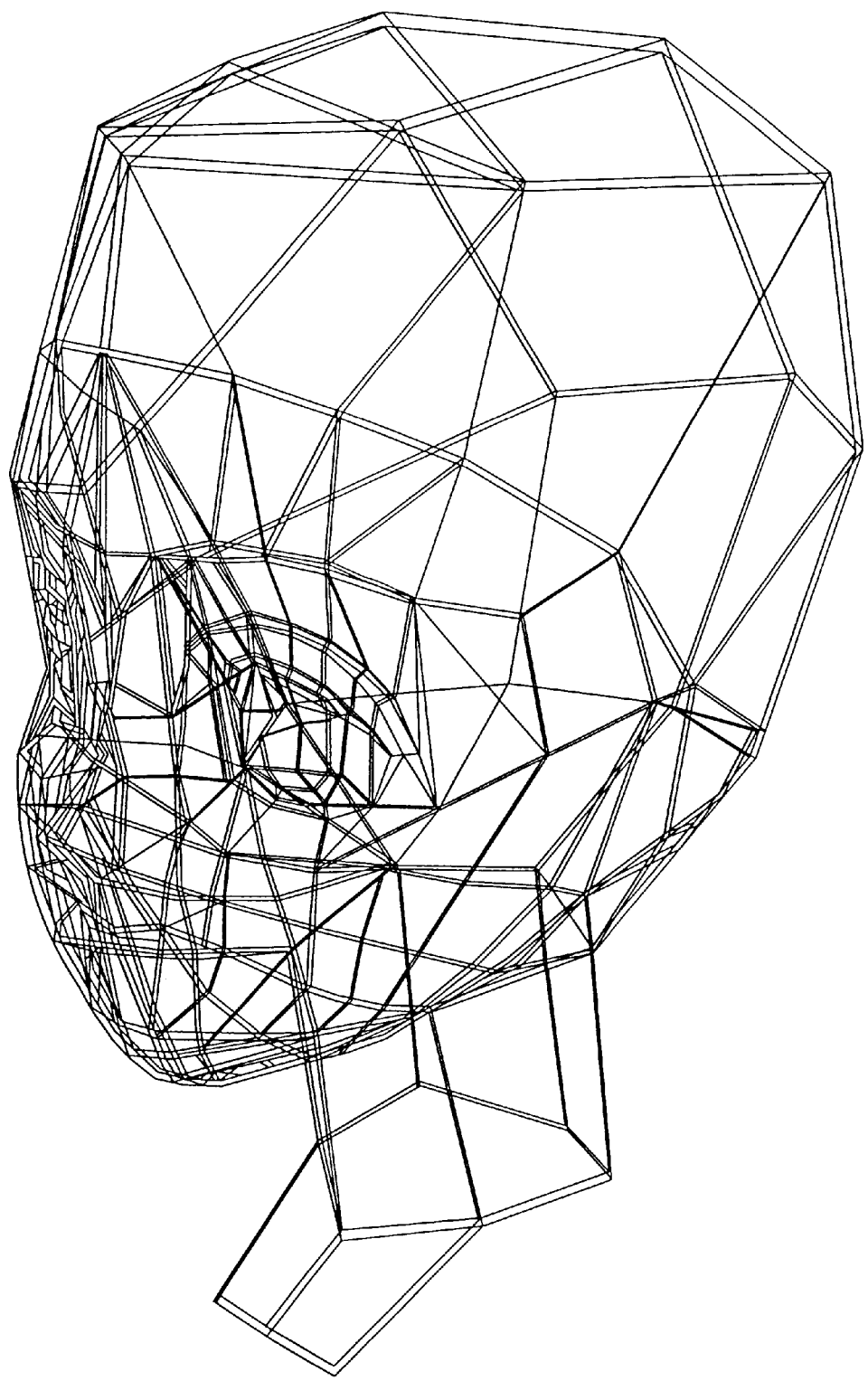
FIG. 4 illustrates an example of wire frames used for disposing basic polygons and similar polygons according to the first-embodiment of the present invention.

Subsequently, in step S305, based on the data concerning the image to be displayed on the display unit 25 sent from the image determining unit 220 and data concerning the basic polygon and the similar polygon transmitted from the polygon generator 231, the image generator 232 suitably combines the basic polygons, and also arranges a similar polygon on the obverse surface of the corresponding basic polygon. The image generator 232 suitably pastes texture to each of the basic polygons and each of the similar polygons, thereby generating a final polygon image to be displayed on the display unit 25. For example, the image generator 232 disposes the basic polygons, the similar polygons, and the predetermined texture so that they correspond to a wire frame shown in FIG. 4, thereby generating a polygon image. In FIG. 4, two wire frames are shown overlapping with each other, and one wire frame is formed by the basic polygons and the other wire frame is formed by the similar polygons. That is, the inner wire frame is formed by the basic polygons, while the outer wire frame is formed by the similar polygons.

In disposing and pasting the polygons, the similar polygons are first disposed and pasted followed by the basic polygons. If some polygons overlap, the polygon closest to the viewpoint is preferentially displayed. Accordingly, in the polygon display image obtained in this example, the perimeter edges are shown as edges. The principle of displaying edges will be discussed below.

According to the polygon-image display method of this embodiment, edge enhancement can be achieved by performing fine-adjustment of the similar polygons by the adjusting portion 234. The process of this adjusting operation is conceptually shown in FIGS. 5A through 5D. FIGS. 5A through 5D illustrate the shifting of the positions of the vertices of a similar polygon to be adjusted (not shown) to the positions which are determined based on the vertices (in this example, $V_0$ and $V_1$) of the corresponding basic polygon.

In performing the processing for drawing sharp edges, normal vectors of each basic polygon (in FIG. 5A, vectors $h_0$, $h_1$, $h_2$, $h_3$, and $h_4$) are first detected. Normal vectors are detected for all the basic polygons which contact the vertices $V_0$ and $V_1$ of the basic polygon corresponding to the vertices of the similar polygon to be shifted. In this example, $h_0$, $h_2$, $h_3$, and $h_4$ are detected as the normal vectors of the basic polygons which contact the vertex $V_0$, and $h_0$, $h_1$, and $h_3$ are detected as normal vectors of the basic polygons which contact the vertex $V_1$. As a result, the normal vectors $h_0$, $h_1$, $h_2$, $h_3$, and $h_4$ are detected.

Figure 5A:
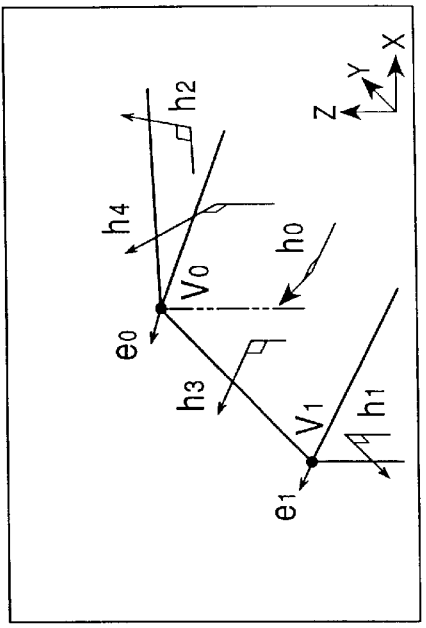
FIGS. 5A through 5D illustrate a technique for adjusting the positions of the vertices of a similar polygon.
Figure 5B:
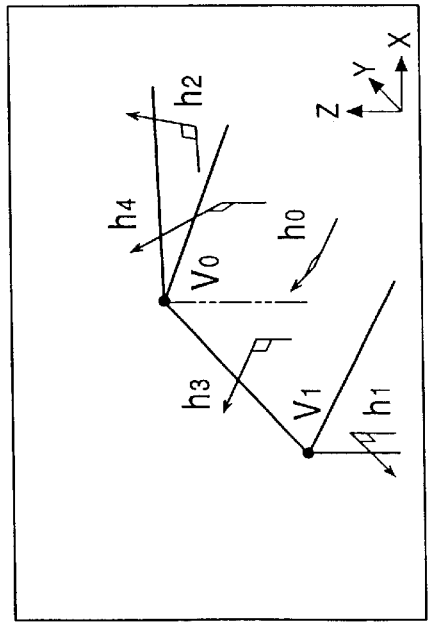

Subsequently, as shown in FIG. 5B, the sum of the normal vectors of the basic polygons which contact each of the vertices $V_0$ and $V_1$ is determined. Then, a unit vector having the same direction as the sum vector is determined for each of the vertices $V_0$ and $V_1$. In this example, for the vertex $V_0$, the sum of the vectors $h_0$, $h_2$, $h_3$, and $h_4$ is determined, and then, a vector $e_0$ is determined as the unit vector. For the vertex $V_1$, the sum of the vectors $h_0$, $h_1$, and $h_3$ is determined, and then, a vector $e_1$ is determined as the unit vector.

Figure 5C:
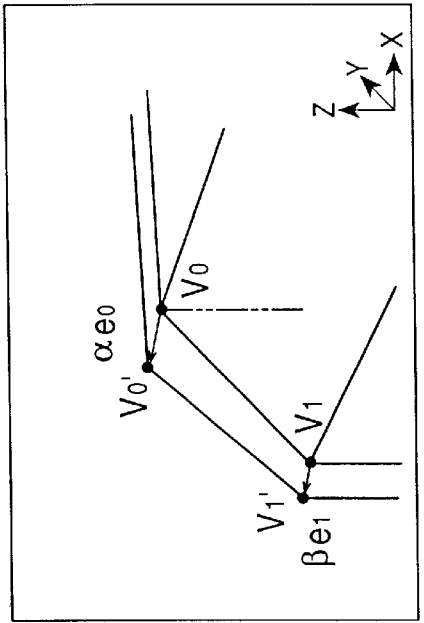

Then, as shown in FIG. 5C, each of the unit vectors $e_0$ and $e_1$ is multiplied by a predetermined coefficient so as to determine a displacement vector for each of the vertices $V_0$ and $V_1$. These coefficients may be predetermined, such as $\alpha$ for the vertex $V_0$ and $\beta$ for the vertex $V_1$. In this example, it is assumed that the vector $e_0$ is multiplied by the coefficient $\alpha$, resulting in a displacement vector $\alpha e_0$ for the vector $V_0$, and that $e_1$ is multiplied by the coefficient $\beta$, resulting in a displacement vector $\beta e_1$ for the vector $V_1$.

Figure 5D:
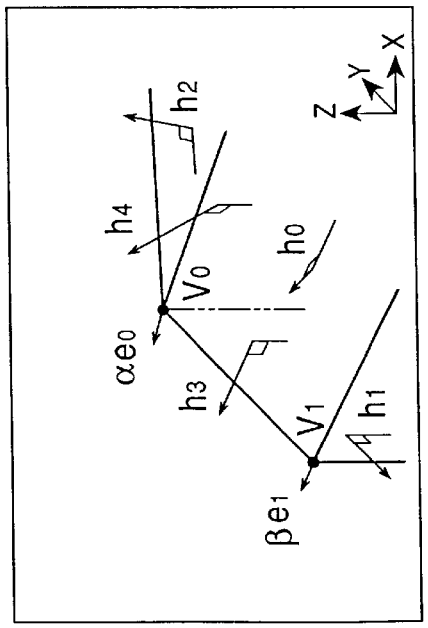

Subsequently, as illustrated in FIG. 5D, by using the vertices $V_0$ and $V_1$ as original points, the above displacement vectors $\alpha e_0$ and $\beta e_1$ are disposed, and the forward points of the vectors $\alpha e_0$ and $\beta e_1$ are set to be edge points $V_0'$ and $V_1'$, respectively. The edge points $V_0'$ and $V_1'$ are points to which the vertices of the similar polygon corresponding to the vertices $V_0$ and $V_1$ are to be shifted.

Ultimately, the vertices (not shown) of the similar polygon corresponding to the vertices $V_0$ and $V_1$ are shifted to the edge points $V_0'$ and $V_1'$, respectively. The similar polygon has thus undergone fine adjustment. The resulting edges can be joined with each other without a displacement therebetween. Additionally, the thickness of the edges can be varied according to whether a long-distance view or a short-distance view is displayed, and thicker edges can be displayed for the portions to be highlighted.

In the example shown in FIGS. 5A through 5D, the forward points of the displacement vectors $\alpha e_0$ and $\beta e_1$ are determined to be the edge points $V_0'$ and $V_1'$, respectively. However, the forward points of the unit vectors $e_0$ and $e_1$ using the vertices $V_0$ and $V_1$ as original points may be respectively set as the edge points $V_0'$ and $V_1'$, and thus, the vertices (not shown) of the similar polygon corresponding to $V_0$ and $V_1$ may be shifted to the edge points $V_0'$ and $V_1'$, respectively.

Although in this embodiment the adjusting portion 234 is disposed in the image generator 232, it may be disposed in the polygon generator 231 or the similar-polygon-data storage unit 250. In this case, a similar polygon can be adjusted in the polygon generator 231 according to the method discussed with reference to FIGS. 5A through 5D, and it is then sufficient that the image generator 232 merely combines the adjusted similar polygon and the corresponding basic polygon to create an image. Alternatively, similar polygon data concerning the adjusted similar polygon image may be generated in advance, and may then be stored in the similar-polygon-data storage unit 250.

After performing fine adjustment on the similar polygon, texture is pasted on the similar polygon. The texture pasted on the similar polygon must be different from that pasted on the corresponding basic polygon. In this example, a black texture only is disposed on all the similar polygons, thereby enhancing the sharpness of the similar polygons as the edges of the basic polygons.

Instead of disposing a different texture from that on the basic polygon, the similar polygon may be filled in with, for example, a single color, so that it is displayed differently from the basic polygon.

Then, in step S306 of FIG. 3, data concerning the polygon image generated by the image generator 232 is sent to the display unit 25, so that a desired polygon image can be displayed on the display unit 25.

Figure 6A:
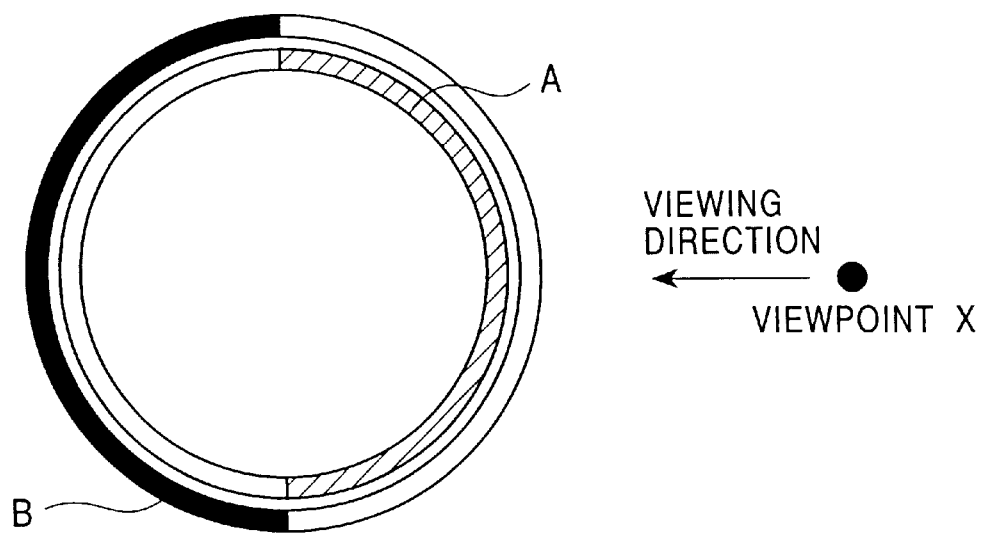
FIGS. 6A and 6B illustrate an example of a polygon image displayed according to the polygon-image display method of the first embodiment of the present invention.
Figure 6B:
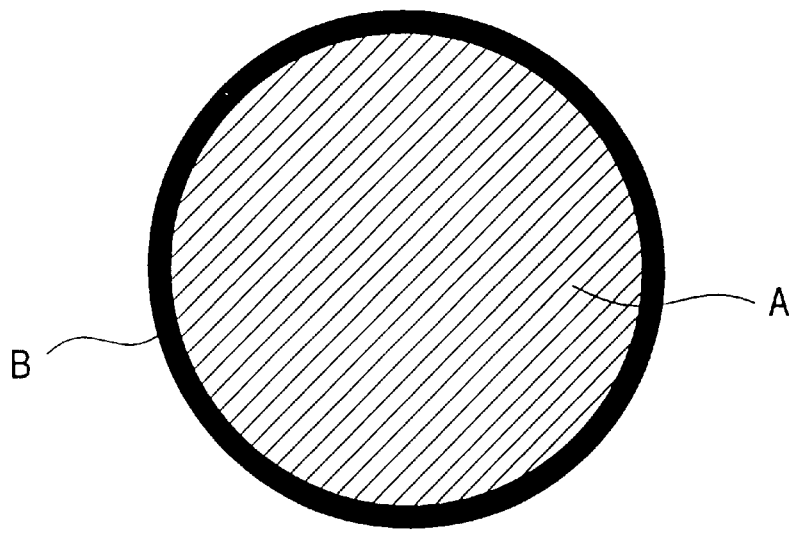

An example of such a polygon image is shown in FIGS. 6A and 6B. In this example, a sphere A is expressed by basic polygons, as shown in FIG. 6A. This sphere A is expressed by a large number of polygons, though they are not shown. Outside of this sphere A, a sphere B consisting of a set of similar polygons is displayed. The set of similar polygons representing the sphere B is disposed in such a manner that the reverse surface of the similar polygons faces the obverse surface of the basic polygons. This is explained more fully below when the player views the sphere A and the sphere B from the current viewpoint X. Based on the fact that the reverse surface of the polygons cannot be seen from a predetermined viewpoint, only the semispherical portion of the sphere A closer to the viewpoint X is shown, and only the semispherical portion of the sphere B farther from the viewpoint X is shown. Accordingly, the sphere A and the sphere B viewed from the viewpoint x can be seen as an image shown in FIG. 6B. That is, the portion of the sphere B outside the sphere A appears to be an edge of the sphere A.

Second Embodiment

According to a second embodiment of the present invention, a method for displaying a polygon image provided with edges by using sides of a basic polygon which are extracted and by disposing segments on the extracted sides is now discussed. The same elements as those shown in FIGS. 1 through 6 of the first embodiment are not shown.

The polygon-image display method of the second embodiment is employed in a game machine 2 similar to that discussed in the first embodiment. The specific configuration of the game machine 2 is similar to that shown in FIG. 1. When the game machine 2 is powered on or reset while the CD-ROM 44, which serves as a recording medium of the present invention, is loaded in the disk drive 41, the CPU 11 executes the OS stored in the ROM 14. By executing the OS, the CPU 11 initializes the entire machine 2, such as checking the operation, and controls the disk control unit 40 so as to load the game program stored in the CD-ROM 44 to the main memory 13 and executes it. By running the game program, the CPU 11 forms the functional blocks shown in FIG. 7 so as to implement the video game machine 2.

Figure 7:
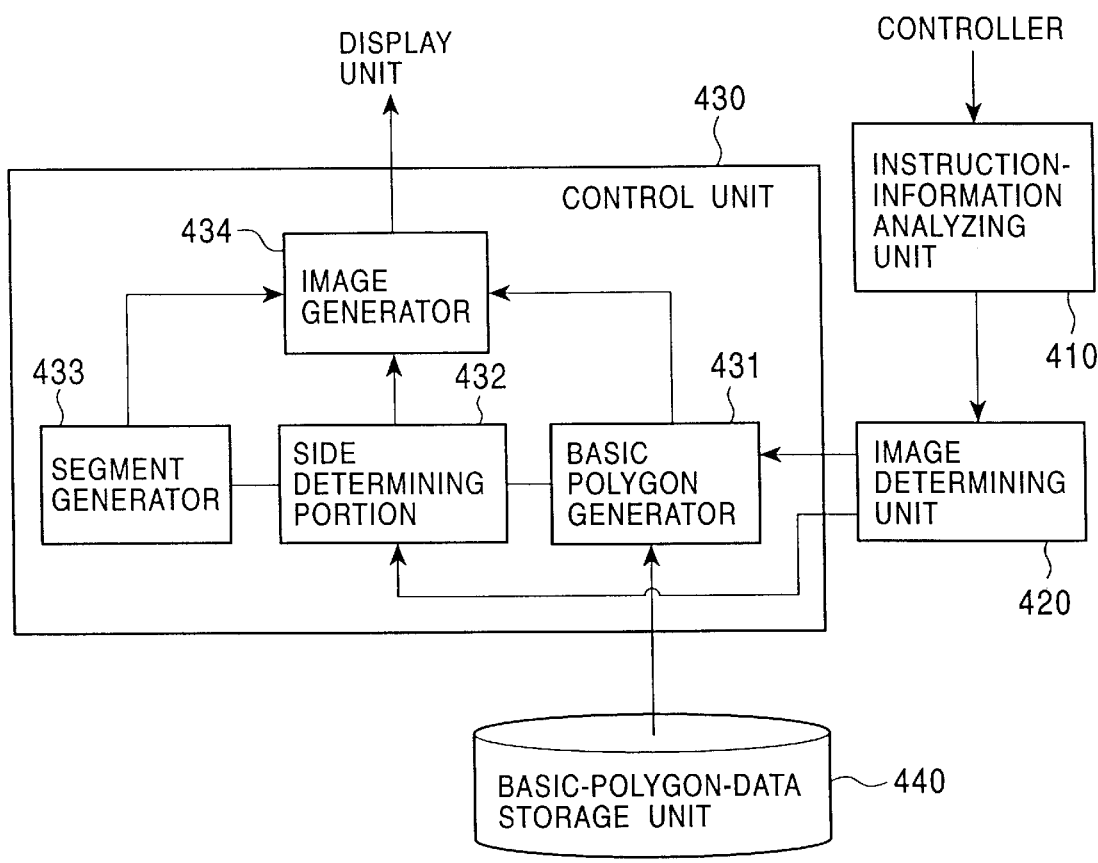
FIG. 7 is a functional block diagram illustrating an example of the configuration of a game machine according to a second embodiment of the present invention.

The video game machine 2 of this embodiment is formed of, as shown in FIG. 7, an instruction-information analyzing unit 410, an image determining unit 420, a control unit 430, and a basic-polygon-data storage unit 440, which serves as a recording unit. The instruction-information analyzing unit 410 and the image determining unit 420 have functions similar to those of the counterparts 210 and 220, respectively, of the first embodiment.

The basic-polygon-data storage unit 440 stores basic polygon data similar to that stored in the basic-polygon-data storage unit 240 of the first embodiment.

The control unit 430 includes a basic polygon generator 431, a side determining portion 432, a segment generator 433, and an image generator 434. The basic polygon generator 431 reads the basic polygon data based on the data concerning the image determined by the image determining unit 420, and generates the basic polygons.

The side determining portion 432 has the function of extracting the sides to be used as edges from the sides of each polygon, based on the data concerning the image determined by the image determining unit 420 and the data concerning the polygon data sent from the basic polygon generator 431.

Upon receiving the data of the sides from the side determining portion 432, the segment generator 433 generates segments to be disposed along the edges extracted by the side determining portion 432.

Upon receiving the data of the basic polygons generated by the basic polygon generator 431, the data of the sides extracted by the side determining portion 432, and the data of the segments generated by the segment generator 433, the image generator 434 generates a polygon image to be displayed on the display unit 25 based on the above-described data.

Figure 8:
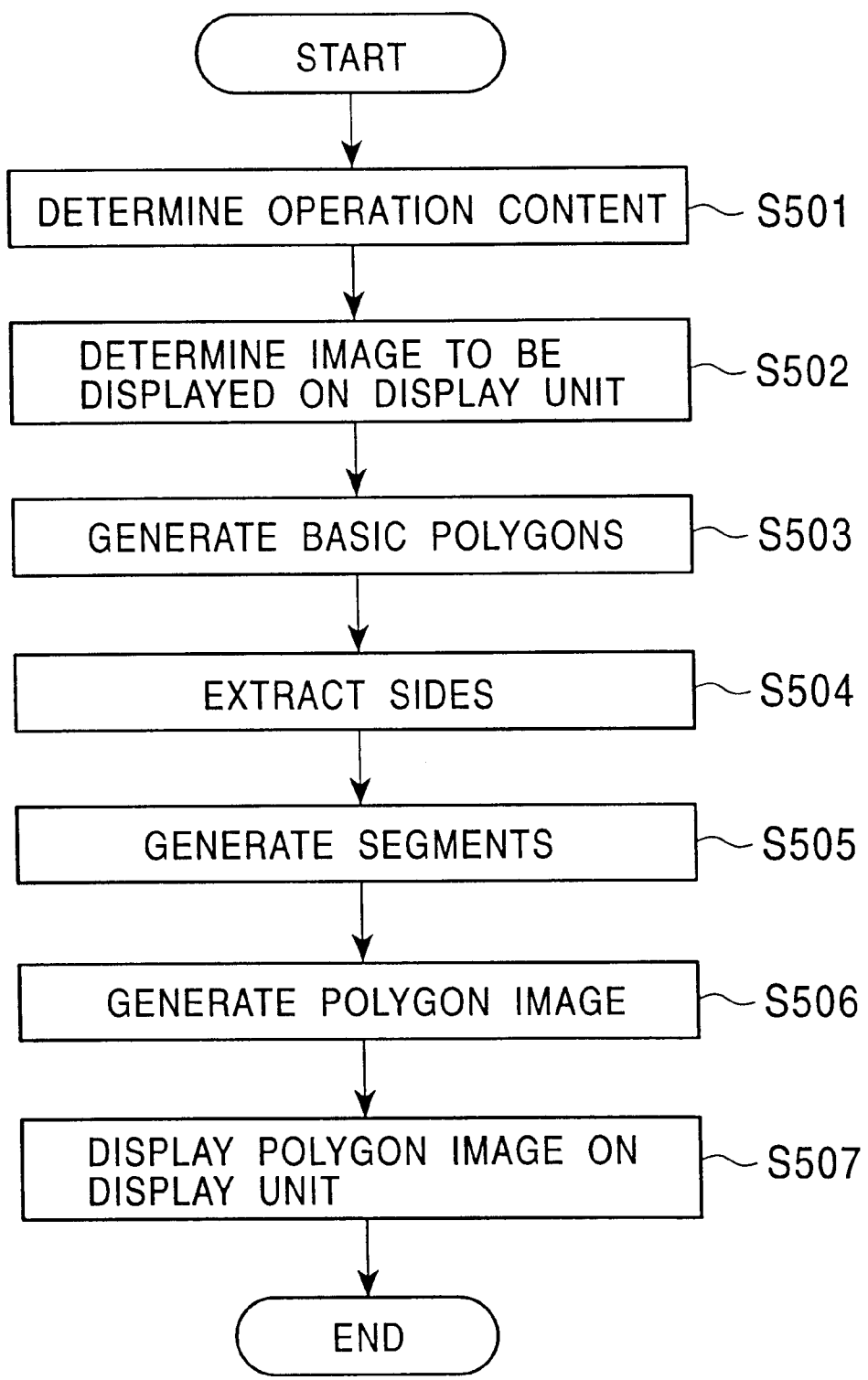
FIG. 8 is a flow chart illustrating a polygon-image display method according to the second embodiment of the present invention.

The operation of this game machine 2 is discussed below while referring to a polygon-image display method according to this embodiment. Details of the image displaying operation performed by the game machine 2 are as follows, as shown in FIG. 8.

The game machine 2 executes a predetermined game according to predetermined scenarios and rules. The game machine 2 forms polygon images in the following manner when displaying images on the display unit 25 after running the game or displaying a demonstration image.

In displaying a polygon image, in step S501, the instruction-information analyzing unit 410 first determines whether there is any instruction input from the player through the controller 52, and if any, further determines the content of the operation instruction input from the controller 52. Data concerning the content of the operation determined by the instruction-information analyzing unit 410 is sent to the image determining unit 420. Then, in step S502, the image determining unit 420 determines the image to be displayed on the display unit 25 based on the above-described data and the game scenario. The image determining unit 420 then sends data concerning the basic polygons required for creating the image to the polygon generator 431 and also sends other data required for creating the image to the image generator 434.

In step S503, the polygon generator 431 reads the basic polygon data from the basic-polygon-data storage unit 440 and generates the basic polygons based on the data.

Then, in step S504, based on the data sent from the image determining unit 420 and the data sent from the basic polygon generator 431, the side determining portion 432 extracts predetermined sides. In this case, two types of sides can be extracted. One type is sides which are not adjacent to other basic polygons, and the other type is sides which are also part of an adjacent basic polygon which is unseen from the current viewpoint. In other words, such an adjacent basic polygon is located with its reverse surface facing the current viewpoint, so that it is not displayed on the display screen 25. The first type of sides, i.e., the sides which are not adjacent to other basic polygons, can be easily selected by determining a combination of the basic polygons based on the data sent from the image determining unit 420 and the data sent from the basic polygon generator 431.

Figure 9:
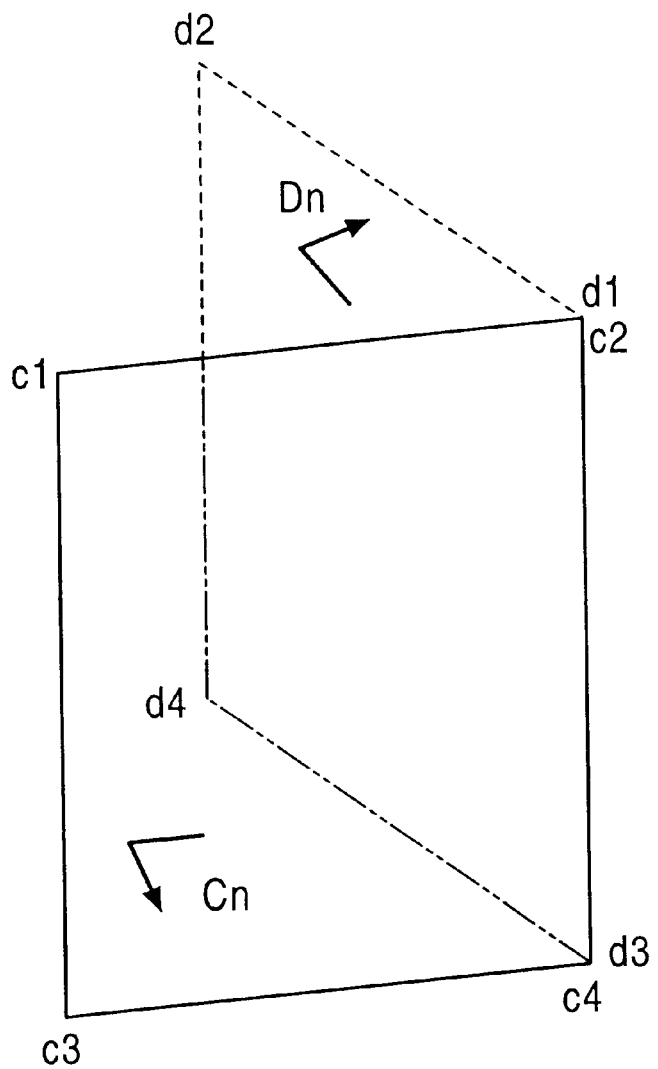
FIG. 9 illustrates the concept of an edge extracting technique according to the polygon-image display method of the second embodiment of the present invention.

In the example shown in FIG. 9, among two basic polygons C (quadrilateral basic polygon defined by four vertices, i.e., $c_1$ through $c_4$) and D (quadrilateral basic polygon defined by four vertices, i.e., $d_1$ through $d_4$), a side $c_1c_2$ (which is a side defined by two vertices $c_1$ and $c_2$, and the same applies to the following description), a side $c_1c_3$, and a side $c_3c_4$ are determined to be sides which are not adjacent to other basic polygons.

A side $c_4c_2$ is a side which is also part of the adjacent basic polygon (D), and the adjacent basic polygon D cannot be seen from the current viewpoint. Accordingly, the side $c_4c_2$ is also extracted. As discussed above, the adjacent basic polygon corresponding to the second type of sides is located with its reverse surface facing the current viewpoint. Thus, by determining whether the obverse surface or the reverse surface of the adjacent basic polygon faces the current viewpoint, the second type of sides can be selected. Such a determination can be made according to, for example, the following two techniques.

According to one technique, normal vectors of each basic polygon are determined, and then, the inner product of each of the normal vectors and a viewpoint vector in the viewing direction is determined. Then, according to the sign (positive or negative) of the inner product, the second type of sides which also form other basic polygons can be extracted. This is explained more fully with reference to FIG. 9.

For the basic polygons C and D shown in FIG. 9, normal vectors $C_n$ and $D_n$ are respectively detected, and the inner product of each of the normal vectors $C_n$ and $D_n$ and the viewpoint vector $X_v$ in the viewing direction from the viewpoint X is calculated. It is now assumed that the angle between each of the normal vectors $C_n$ and $D_n$ of the basic polygons C and D and the viewpoint vector $X_v$ is $\theta$. When the above-described calculation result is $90°<\theta<270°$, the inner product is determined to be negative. In this case, the basic polygon is located with its obverse surface facing the viewpoint and is thus displayed. When the calculation result is $-90°<\theta<90°$, the inner product is determined to be positive. In this case, the basic polygon is located with its reverse surface facing the viewpoint and is thus unseen. When $\theta=\pm90°$, the inner product is determined to be zero. In this case, the basic polygon is located parallel to the viewing direction and thus cannot be displayed. According to the above-described calculations, the side $c_2c_4$ is determined to be a side which is also part of the unseen adjacent basic polygon.

According to the other technique of determining this type of sides, order information concerning a predetermined order is pre-assigned to each vertex or each side of each basic polygon. Then, by detecting the order information for each polygon, the second type of sides can be extracted according to the order information as viewed from the viewpoint.

This is explained more specifically with reference to FIG. 9. In this example, symbols $c_1$ through $c_4$ are assigned to the individual vertices of the basic polygons. The numerals of the symbols $c_1$ through $c_4$ indicate the order information. By tracing the numerals from $c_1$ to $c_3$, it is determined whether they are arranged clockwise or counterclockwise from the viewpoint X. It is thus possible to determine whether the obverse surface or the reverse surface of each of the basic polygons C and D faces the viewpoint X. When the positional coordinates of the vertices $c_1$ through $c_3$ in the two-dimensional plane are $(c_{1x}, c_{1y})$, $(c_{2x}, c_{2y})$, and $(c_{3x}, c_{3y})$, respectively, the outer product can be found by the expression: $-(c_{3y}-c_{2y})\times(c_{1x}-c_{3x})+(c_{3x}-c_{2x})\times(c_{1y}-c_{3y})$. In this case, if the vertices $c_1$ through $c_3$ are arranged clockwise, the outer product becomes greater than 0. In this case, the basic polygon is located with its obverse surface facing the viewpoint. If the vertices $c_1$ through $c_3$ are arranged counterclockwise, the outer product becomes smaller than 0. In this case, the basic polygon is located with its reverse surface facing the viewpoint, and is thus unseen. If the vertices $c_1$ through $c_3$ are arranged on the same line, the outer product becomes zero. In this case, the basic polygon is located parallel to the viewing direction and thus cannot be displayed. According to the above-described calculations, the side $c_2c_4$ is determined to be a side which is part of the unseen adjacent basic polygon.

The sides are thus extracted, as described above. In the example shown in FIG. 9, all the sides $c_1c_2$, $c_1c_3$, $c_3c_4$, and $c_2c_4$ of the basic polygon C are extracted. In step S505 of FIG. 8, the data of the extracted sides is sent from the side determining portion 432 to the segment generator 433. Based on the received data, the segment generator 433 generates segments to be disposed along the extracted sides.

Then, in step S506, based on the data of the image to be displayed on the display unit 25 sent from the image determining unit 420, the data of the basic polygons sent from the basic polygon generator 431, and the data of the segments from the segment generator 433, the image generator 434 suitably combines the basic polygons and disposes the segments to the corresponding sides of the basic polygon so as to generate a final polygon image to be displayed on the display unit 25.

Figure 10A:
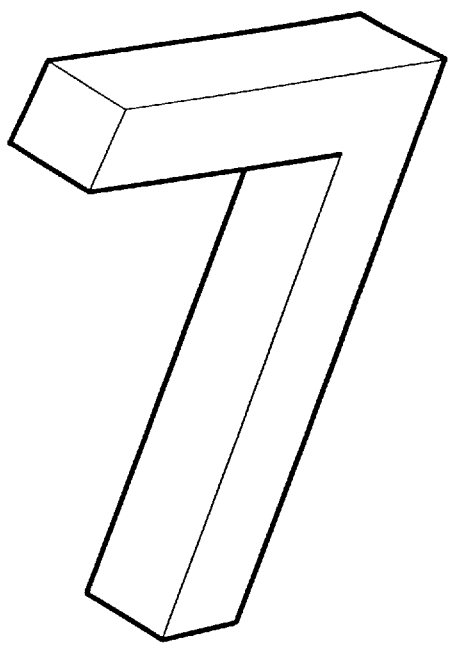
FIGS. 10A and 10B illustrate an example of a polygon image displayed according to the polygon image display method of the second embodiment of the present invention.

Subsequently, in step S507, the data of the polygon image created by the image generator 434 is sent to the display unit 25, and thus, a desired polygon image is displayed on the display unit 25. Such a polygon image may be displayed, as shown in FIG. 10A. In this example, an inverted L-shaped three-dimensional object is represented by polygons provided with edges. The segments are indicated as thick lines for edge enhancement.

Figure 10B:
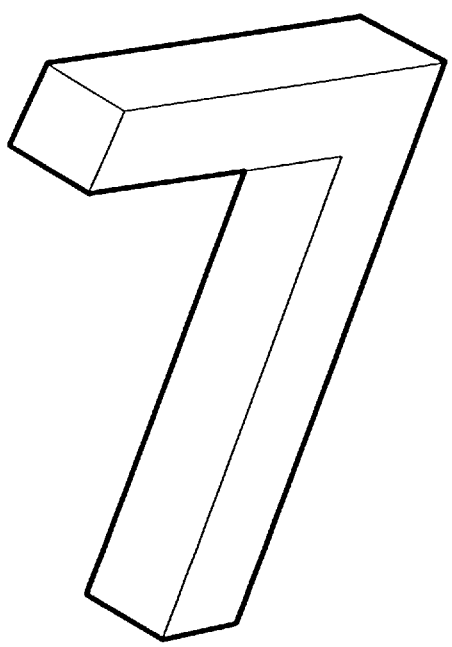

In combining a basic polygon and segments so as to create an image in the image generator 434, the segments are drawn along the outside of the edges, and if the segments and the polygon overlap, the polygon may be preferentially displayed. Accordingly, the edges other than the perimeter edges are filled in with the adjacent basic polygons, thereby achieving proper edging processing. Such a polygon image may be indicated, as shown in FIG. 10B. The image shown in FIG. 10B differs from that in FIG. 10A in that the edge other than the perimeter edges (in this example, the segment extending from the intersection of the two inner lines of the inverted L-shaped object) is eliminated, whereby proper edging processing is completed.

In drawing the segments outside the sides, the segments can be generated according to the following technique.

An example of this technique is described in detail below with reference to FIGS. 11A through 11D. In FIGS. 11A through 11D, among the sides of each basic polygon having normal vectors $h_0$, $h_1$, $h_2$, $h_3$, and $h_4$, a segment to be disposed outside the side defined by the vertices $V_0$ and $V_1$ is generated.

Figure 11A:
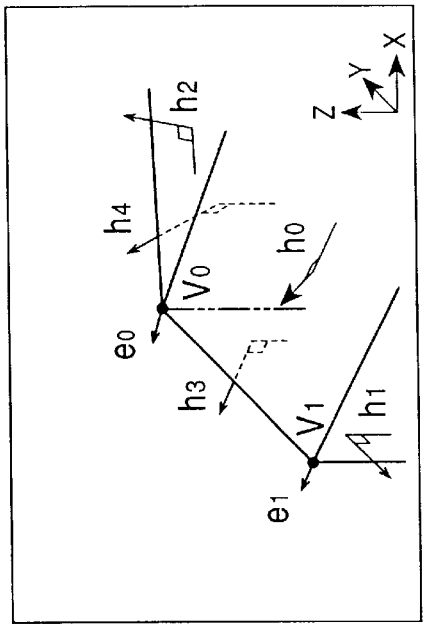
FIGS. 11A through 11D illustrate an example of a segment generating technique.

In performing this processing, as illustrated in FIG. 11A, the normal vectors $h_0$, $h_1$, $h_2$, $h_3$, and $h_4$ of each basic polygon must first be detected. The normal vectors are detected for all the basic polygons which contact the vertices $V_0$ and $V_1$, which are end points of the side $V_0V_1$. In this example, as the normal vectors of the basic polygons which contact the vertex $V_0$, $h_0$, $h_2$, $h_3$, and $h_4$ are detected, and as the normal vectors of the basic polygons which contact the vertex $V_1$, $h_0$, $h_1$, and $h_3$ are detected. As a result, all the normal vectors $h_0$, $h_1$, $h_2$, $h_3$, and $h_4$ are detected.

Figure 11B:
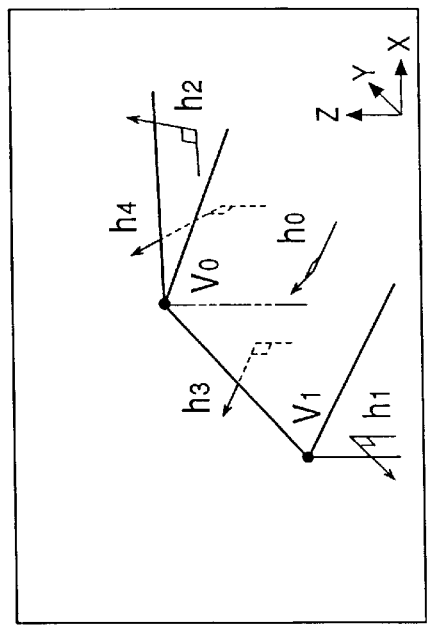

Then, as shown in FIG. 11B, for each of the vertices $V_0$ and $V_1$, the sum of the normal vectors of the basic polygons which contact each of the vertices $V_0$ and $V_1$ is determined. A unit vector having the same direction as the sum vector is then determined for each of the vertices $V_0$ and $V_1$. In this example, a vector $e_0$ is found as the unit vector for the vertex $V_0$, while a vector $e_1$ is found as the unit vector for the vertex $V_1$.

Figure 11C:
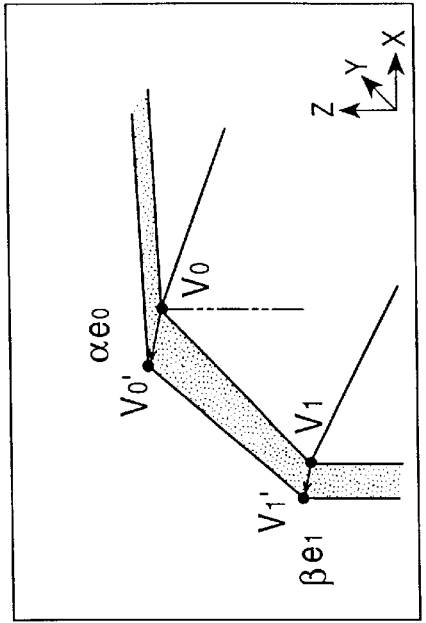

Then, as illustrated in FIG. 11C, each of the unit vectors $e_0$ and $e_1$ is multiplied by a predetermined coefficient so as to determine a displacement vector for each of the vertices $V_0$ and $V_1$. These coefficients may be predetermined, such as $\alpha$ for the vertex $V_0$ and $\beta$ for the vertex $V_1$. In this example, it is assumed that the vector $e_0$ is multiplied by the coefficient $\alpha$, resulting in a displacement vector $\alpha e_0$ for the vertex $V_0$, and that the vector $e_1$ is multiplied by the coefficient $\beta$, resulting in a displacement vector $\beta e_1$ for the vertex $V_1$.

Figure 11D:
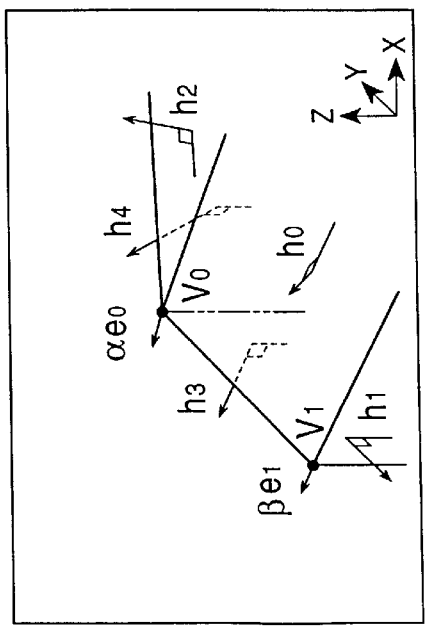

As shown in FIG. 11D, the displacement vectors $\alpha e_0$ and $\beta e_1$ are respectively located by using the vertices $V_0$ and $V_1$ as the original points, and the forward points of the displacement vectors $\alpha e_0$ and $\beta e_1$ are set to be edge points $V_0'$ and $V_1'$, respectively.

Ultimately, the quadrilateral portion surrounded by the edge points $V_0'$ and $V_1'$ and the original points $V_0$ and $V_1$ is set to be a segment to be disposed along the side $V_0V_1$. With this method, adjacent segments can be joined with each other without a displacement therebetween, thereby achieving edge enhancement. Additionally, the thickness of the edges can be varied according to whether a long-distance view or a short-distance view is displayed, and thicker edges can be displayed for the portions to be highlighted.

In the example shown in FIG. 11D, the forward points of the displacement vectors $\alpha e_0$ and $\beta e_1$ are determined to be the edge points $V_0'$ and $V_1'$, respectively. However, the forward points of the unit vectors $e_0$ and $e_1$ using the vertices $V_0$ and $V_1$ as original points may be set to the edge points $V_0'$ and $V_1'$, respectively, and thus, the quadrilateral portion surrounded by the edge points $V_0'$ and $V_1'$ and the vertices $V_0$ and $V_1$ may be set to the segment to be disposed along the side $V_0V_1$.

As is seen from the foregoing description, according to the present invention, edges or perimeter edges can be provided for three-dimensional images using polygons, thereby increasing the range of applicability of the polygon-based image display method. This method is particularly suitable for displaying cartoon images and animation images using polygons.

What is claimed is:

1. A polygon-image display method for use in an apparatus for displaying a polygon image on a predetermined display unit, the polygon image being generated by combining basic polygons for rendering a three-dimensional object, said polygon-image display method comprising the step of rendering a similar polygon, the reverse surface of which faces the obverse surface of the basic polygon, said similar polygon being larger than the basic polygon and having a similar shape to the basic polygon, and forming a pair with the basic polygon.

2. A polygon-image display method according to claim 1, wherein the center of gravity of the similar polygon coincides with the center of gravity of the corresponding basic polygon.

3. A polygon-image display method according to claim 1, wherein the similar polygon is rendered first followed by rendering of the corresponding basic polygon.

4. A polygon-image display method according to claim 3, further comprising the steps of:

detecting normal vectors of other basic polygons which are adjacent to each of the vertices of the basic polygon corresponding to the similar polygon;

determining a unit vector having a direction identical to the direction of a sum vector of the normal vectors;

setting the forward end of the unit vector to an edge point for each of the vertices of the basic polygon as an original point; and shifting the vertices of the similar polygon to the edge points.

5. A polygon-image display method according to claim 4, wherein the unit vector is multiplied by a predetermined coefficient so as to determine a displacement vector, and the forward end of the displacement vector is set to be the edge point for each of the vertices of the basic polygon as an original point, thereby shifting the vertices of the similar polygon to the edge points.

6. A polygon-image display method according to claim 5, wherein the coefficient pre-assigned to each of the vertices of the basic polygon is different from the coefficients pre-assigned to the other vertices.

7. A polygon-image display method according to claim 1, further comprising the steps of:

detecting normal vectors of other basic polygons which are adjacent to each of the vertices of the basic polygon corresponding to the similar polygon;

determining a unit vector having a direction identical to the direction of a sum vector of the normal vectors;

setting the forward end of the unit vector to an edge point for each of the vertices of the basic polygon as an original point; and shifting the vertices of the similar polygon to the edge points.

8. A polygon-image display method according to claim 7, wherein the unit vector is multiplied by a predetermined coefficient so as to determine a displacement vector, and the forward end of the displacement vector is set to be the edge point for each of the vertices of the basic polygon as an original point, thereby shifting the vertices of the similar polygon to the edge points.

9. A polygon-image display method according to claim 8, wherein the coefficient pre-assigned to each of the vertices of the basic polygon is different from the coefficients pre-assigned to the other vertices.

10. A polygon-image display apparatus comprising:

storage means for storing basic polygon data concerning a basic polygon for rendering a three-dimensional object and similar polygon data concerning a similar polygon which is larger than the basic polygon and has a similar shape to the basic polygon in such a manner that the basic polygon data and the similar polygon data correspond to each other; and control means for generating the basic polygon and the corresponding similar polygon, the reverse surface of which faces the obverse surface of the basic polygon, based on the basic polygon data and the similar polygon data, respectively, read from said storage means, and for displaying an image of the basic polygon and an image of the similar polygon which is disposed on the obverse surface of the basic polygon.

11. A computer-readable recording medium for storing a program code which causes a computer to execute processing comprising the steps of:

reading from storage means basic polygon data concerning a basic polygon for rendering a three-dimensional object and similar polygon data concerning a similar polygon which is larger than the basic polygon and has a similar shape to the basic polygon, and the reverse surface of which faces the obverse surface of the basic polygon;

generating the basic polygon and the corresponding similar polygon based on the read basic polygon data and the read similar polygon data, respectively; and displaying a polygon image including an image of the basic polygon and an image of the similar polygon which is disposed on the obverse surface of the basic polygon.

12. A polygon-image display method for use in an apparatus for displaying a polygon image on a predetermined display unit, the polygon image being generated by combining basic polygons for rendering a three-dimensional object, said polygon-image display method comprising the steps of:

extracting, from edges of each of the basic polygons, an edge including an edge which is not adjacent to any other basic polygons and an edge which is also part of another adjacent basic polygon which is unseen from a current viewpoint; and drawing a segment along the extracted edge.

13. A polygon-image display method according to claim 12, wherein a normal vector of each of the basic polygons is determined, and the inner product of the normal vector and a viewpoint vector in a viewing direction of the current viewpoint is determined, and the edge which is adjacent to the unseen adjacent basic polygon is extracted according to the sign of the inner product.

14. A polygon-image display method according to claim 12, wherein order information concerning a predetermined order is pre-assigned to one of each of the vertices and each of the edges of each of the basic polygons, and is detected for each of the polygons so as to extract the edge which is adjacent to the unseen adjacent basic polygon according to the arrangement of the order information as viewed from the current viewpoint.

15. A polygon-image display method according claim 12, wherein the segment is drawn along the outside of the edge, and when the segment and the basic polygon overlap, the basic polygon is preferentially displayed.

16. A polygon-image display method according to claim 15, wherein the step of drawing the segment comprises the steps of:

detecting normal vectors of each of the basic polygons which is adjacent to end points of the edge;

determining a unit vector having a direction identical to the direction of a sum vector of the normal vectors;

setting the forward end of the unit vector to an edge point for each of the end points of the edge as an original point and connecting the edge points to form another edge; and disposing an image having a different texture from the texture of the basic polygon between the edge of the basic polygon and the edge formed by connecting the edge points.

17. A polygon-image display method according to claim 16, wherein the step of drawing the segment comprises the steps of:

determining a displacement vector by multiplying the unit vector by a predetermined coefficient;

setting the forward end of the displacement vector to an edge point for each of the end points of the edge as an original point; and disposing an image having a different texture from the texture of the basic polygon including the edge between the edge and another edge formed by connecting the original points.

18. A polygon-image display method according to claim 17, wherein the coefficient pre-assigned to each of the vertices of the basic polygon is different from the coefficients pre-assigned to the other vertices.

19. A polygon-image display method according to claim 12, wherein the step of drawing the segment comprises the steps of:

detecting normal vectors of each of the basic polygons which is adjacent to end points of the edge;

determining a unit vector having a direction identical to the direction of a sum vector of the normal vectors;

setting the forward end of the unit vector to an edge point for each of the end points of the edge as an original point and connecting the edge points to form another edge; and disposing an image having a different texture from the texture of the basic polygon between the edge of the basic polygon and the edge formed by connecting the edge points.

20. A polygon-image display method according to claim 19, wherein the step of drawing the segment comprises the steps of:

determining a displacement vector by multiplying the unit vector by a predetermined coefficient;

setting the forward end of the displacement vector to an edge point for each of the end points of the edge as an original point; and disposing an image having a different texture from the texture of the basic polygon including the edge between the edge and another edge formed by connecting the original points.

21. A polygon-image display method according to claim 20, wherein the coefficient pre-assigned to each of the vertices of the basic polygon is different from the coefficients pre-assigned to the other vertices.

22. A polygon-image display apparatus comprising:

storage means for storing basic polygon data concerning basic polygons for rendering a three-dimensional object; and control means for generating the basic polygons based on the basic polygon data read from said storage means, for extracting, from edges of each of the basic polygons, an edge including an edge which is not adjacent to any other basic polygons and an edge which is also part of another adjacent basic polygon which is unseen from a current viewpoint, for generating a segment to be drawn along the extracted edge, and for displaying a polygon image including an image of the basic polygon and an image of the segment on a predetermined display unit.

23. A computer-readable recording medium for storing a program code which causes a computer to execute processing comprising the steps of:

reading basic polygon data concerning basic polygons for rendering a three-dimensional object;

generating the three-dimensional object by a combination of the basic polygons based on the read data and generating an image of a similar polygon corresponding to each of the basic polygons;

extracting, from edges of each of the basic polygons, an edge including an edge which is not adjacent to any other basic polygons and an edge which is also part of another adjacent basic polygon which is unseen from a current viewpoint;

generating a segment to be drawn along the extracted edge; and displaying an image of the basic polygon and an image of the segment on a predetermined display unit.

* * * * *